(12) United States Patent
Raghavan et al.

(10) Patent No.: US 11,337,203 B2
(45) Date of Patent: May 17, 2022

(54) TRANSMISSION CONFIGURATION INDICATION (TCI) STATE SWITCHING FOR 5G NR (71) Applicant: Intel Corporation, Santa Clara, CA (US)

(72) Inventors: Manasa Raghavan, Sunnyvale, CA (US); Jie Cui, San Jose, CA (US); Yang Tang, San Jose, CA (US); Qiming Li, Beijing (CN); Zhibin Yu, Unterhaching (DE)

(73) Assignee: Intel Corporation, Santa Clara, CA (US)

(*) Notice: Subject to any disclaimer, the term of this patent is extended or adjusted under 35 U.S.C. 154(b) by 88 days.

(21) Appl. No.: 16/829,353

(22) Filed: Mar. 25, 2020

(65) Prior Publication Data
US 2020/0229161 A1 Jul. 16, 2020

Related U.S. Application Data (60) Provisional application No. 62/841,690, filed on May 1, 2019.

(51) Int. Cl.
H04W 72/04 (2009.01)
H04L 5/00 (2006.01)
(Continued)

(52) U.S. Cl.
CPC ......... *H04W 72/042* (2013.01); *H04L 5/0048* (2013.01); *H04W 24/10* (2013.01); *H04W 72/085* (2013.01)

(58) Field of Classification Search
CPC ..... H04L 5/0048; H04L 1/0003; H04L 1/001; H04L 1/0031; H04L 1/0072;
(Continued)

(56) References Cited

U.S. PATENT DOCUMENTS

2019/0394793 A1* 12/2019 Venugopal .......... H04L 27/2602
2020/0221485 A1*  7/2020 Cirik ................... H04B 7/0695
2020/0403749 A1* 12/2020 Park ...................... H04L 5/0048

FOREIGN PATENT DOCUMENTS

DE      102020108323 A1    11/2020

OTHER PUBLICATIONS

"German Application Serial No. 102020108323.8, Voluntary Amendment filed May 27, 2021", w/English claims, 35 pgs.

* cited by examiner

*Primary Examiner* — Mansour Oveissi
(74) *Attorney, Agent, or Firm* — Schwegman Lundberg & Woessner, P.A.

(57) ABSTRACT

A next-generation node B (gNB) configured for operation in a fifth-generation system (5GS) encode signalling for transmission to a user equipment (UE) indicating a Transmission Configuration Indication (TCI) state change to activate a new TCI state. A physical downlink control channel (PDCCH) is encoded in accordance with a highest aggregation level if the signalling indicating the TCI state change indicates activation of a new TCI state for the PDCCH. A physical downlink shared channel (PDSCH) is encoded in accordance with a lowest modulation and coding scheme (MCS) level if the signalling indicating the TCI state change indicates activation of a new TCI state for the PDSCH. After the TCI state change, reference signals (RS) are transmitted with a different spatial filter or different antenna ports demodulation of the PDCCH and PDSCH by the UE.

13 Claims, 3 Drawing Sheets (51) Int. Cl.
 *H04W 24/10* (2009.01)
 *H04W 72/08* (2009.01)
(58) Field of Classification Search
 CPC .... H04L 5/0053; H04L 5/0091; H04W 24/10; H04W 72/042; H04W 72/085; H04W 48/12; H04B 7/088
 See application file for complete search history.

TRANSMISSION CONFIGURATION INDICATION (TCI) STATE SWITCHING FOR 5G NR

PRIORITY CLAIM

This application claims priority under 35 U.S.C. 119(e) to U.S. Provisional Patent Application Ser. No. 62/841,690, filed May 1, 2019 [reference number AC1843-Z] which is incorporated herein by reference in its entirety.

TECHNICAL FIELD

Embodiments pertain to cellular communications. Some embodiments relate to transmission configuration indication (TCI) state switching in fifth generation (5G) new radio (NR) systems.

BACKGROUND

In 5G NR, a Transmission Configuration Indication (TCI) state is used to establish the Quasi co-location (QCL) connection between the target reference signal (RS) and the source RS. TCI states are configured for physical downlink control channel (PDCCH) or a physical downlink shared channel (PDSCH) in order to convey the QCL indication for the respective RS. A TCI state change may make it difficult for a user equipment (UE) to successfully receive the PDCCH or PDSCH with the new TCI state. Thus, what is needed are procedures for a TCI state switch to help ensure successful reception of a PDCCH or a PDSCH with a new TCI state.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In accordance with embodiments, a next-generation node B (gNB) configured for operation in a fifth-generation system (5GS) encode signalling for transmission to a user equipment (UE) indicating a Transmission Configuration Indication (TCI) state change to activate a new TCI state. A physical downlink control channel (PDCCH) is encoded in accordance with a highest aggregation level if the signalling indicating the TCI state change indicates activation of a new TCI state for the PDCCH. A physical downlink shared channel (PDSCH) is encoded in accordance with a lowest modulation and coding scheme (MCS) level if the signalling indicating the TCI state change indicates activation of a new TCI state for the PDSCH. After the TCI state change, reference signals (RS) are transmitted with a different spatial filter or different antenna ports demodulation of the PDCCH and PDSCH by the UE. These embodiments are described in more detail below.

In 5G NR systems, a transmission configuration indication (TCI) state is used to establish the quasi co-location (QCL) connection between the target reference signals (RS) and source RS. Two antenna ports are quasi co-located if properties of the channel over which a symbol on one antenna port is conveyed can be inferred from the channel over which a symbol on the other antenna port is conveyed. The antenna ports QCL types are defined below:

| Type | Description |
| --- | --- |
| QCL-TypeA | Doppler shift, Doppler spread, average delay, delay spread |
| QCL-TypeB | Doppler shift, Doppler spread |
| QCL-TypeC | Doppler shift, average delay |
| QCL-TypeD | Spatial Rx parameter |

TCI states are configured for PDCCH, PDSCH and channel state information reference signals (CSI-RS) in order to convey the QCL indication for the respective RS. In frequency range 1 (FR1) QCL Types A-C and in FR2 QCL types A-D are applicable. The QCL Type D for frequency range 2 (FR2) indicates that PDCCH/PDSCH/CSI-RS is transmitted with the same spatial filter as the reference signal associated with that TCI. In FR2, the network can indicate a transmit beam change for PDSCH or PDCCH by switching the TCI state.

Figure 1:
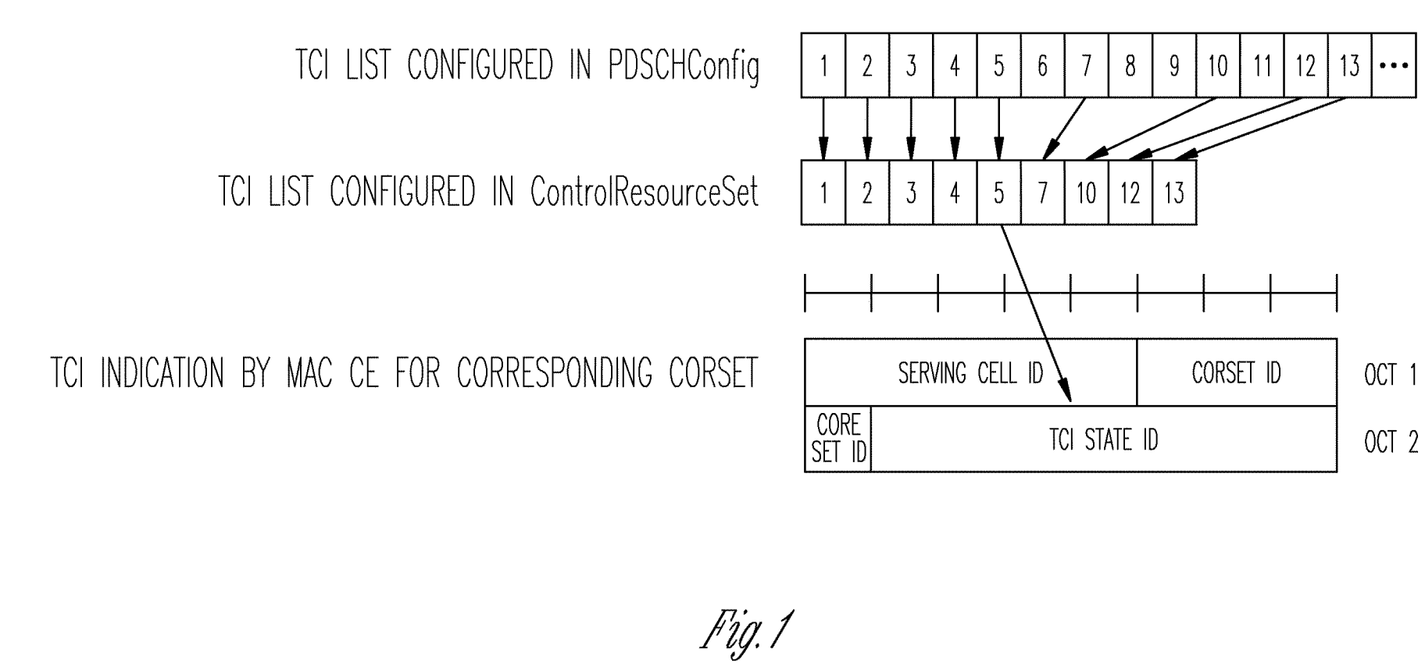
FIG. 1 illustrates TCI states for control resource sets (CORESETs) other than CORESET0 in accordance with some embodiments.

As illustrated in FIG. 1, a UE may be configured with a TCI list for PDSCH and PDCCH via RRC. The TCI states for PDCCH is a subset of those for PDSCH. For PDCCH the network configures the active TCI state via MAC CE. RRC can configure up to 128 TCI states for PDSCH. The UE can have up to eight activated TCI states via MAC CE, although the scope of the embodiments is not limited in this respect.

Figure 2:
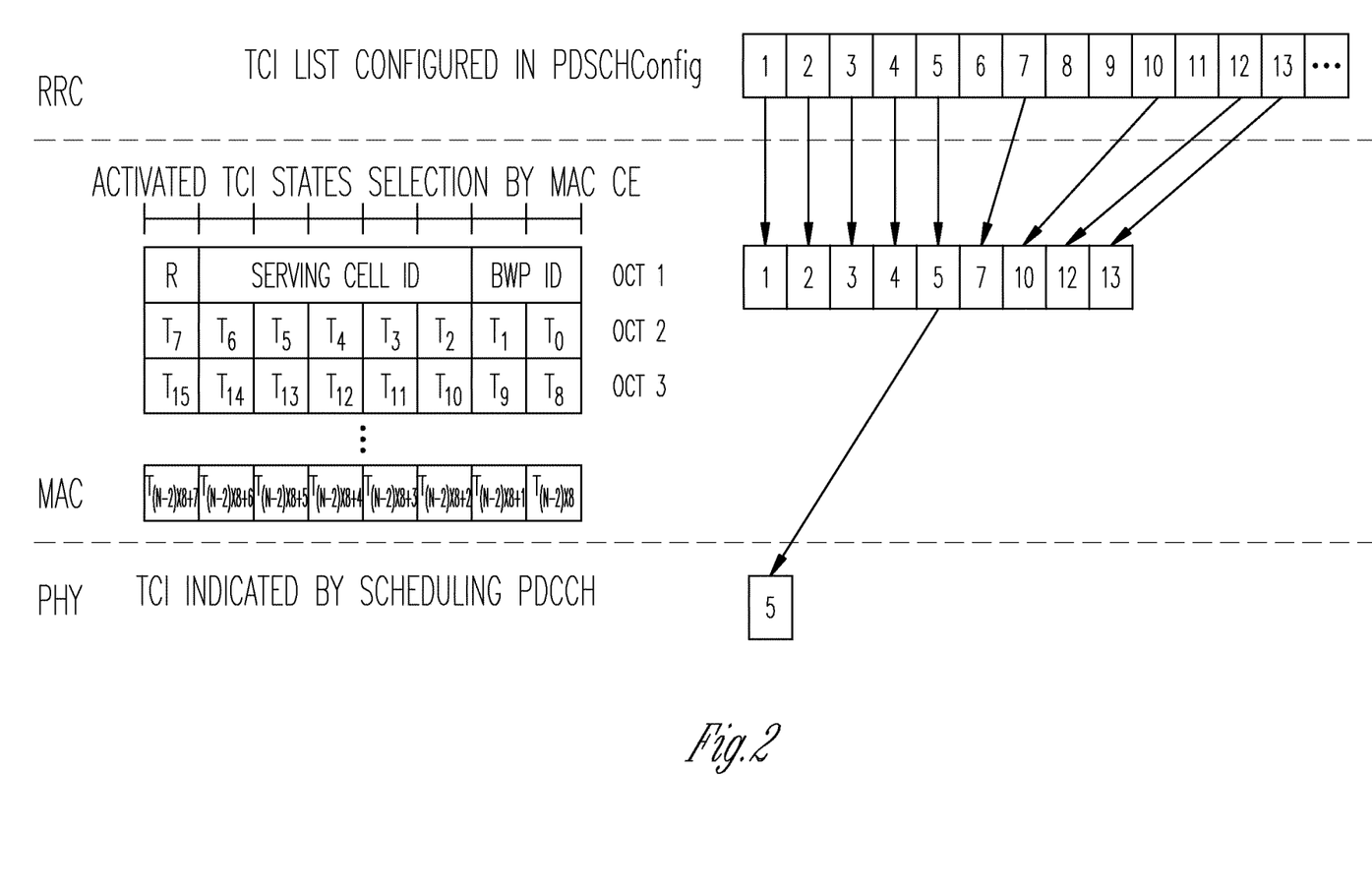
FIG. 2 illustrates TCI states for PDSCH in accordance with some embodiments.

As illustrated in FIG. 2, when UE may be configured with the higher layer parameter tci-PresentInDCI that is set as 'enabled' for the CORESET scheduling the PDSCH, the TCI field is present in downlink control information (DCI) format 1_1. If the scheduling offset between scheduling and PDSCH is larger than Threshold-Sched-Offset and TCI field is present, the TCI state for PDSCH is indicated via DCI. If the tci-PresentInDCI is not configured or PDSCH is scheduled using DCI format 1_0 or the scheduling offset between PDCCH and PDSCH is smaller than Threshold-Sched-Offset, PDSCH follows the TCI of PDCCH. Threshold-Sched-Offset is based on UE capability timeDurationForQCL.

TCI state change and corresponding beam switch could be initiated via MAC CE or DCI. When TCI for PDSCH is indicated by DCI, the TCI state or beam switch can be configured via DCI. DCI based TCI state switch is applicable to PDSCH. When PDSCH follows the TCI state of PDCCH, for a beam switch the TCI state of PDCCH must first be initiated via MAC CE. Hence, for PDCCH MAC CE based TCI state switch would be applicable.

When the network activates a new TCI state via MAC CE for PDCCH or via DCI for PDSCH, the UE is allowed some time to prepare to receive with the new TCI state. In order to successfully receive with the new TCI state, the UE needs to know the Rx beam corresponding to the new TCI state and also time/frequency offset. In addition, the network could follow certain procedures to ensure that the UE receives successfully with the new TCI state.

The network could indicate a TCI state change for PDCCH via MAC CE and command and for PDSCH via DCI. A known TCI state is defined as a target TCI state that the UE can switch to without making further measurements for Rx beam and/or time/frequency synchronization. The TCI state is defined as known if the UE has reported a L1-RSRP or L3-RSRP measurement to the network within a specified time, such that the measurement made by the UE is still valid given the mobility and propagation environment. When the target TCI state is known, the UE is not given additional time for Rx beam refinement for the new TCI state and is expected to switch and receive with the new TCI state after the TCI state switching delay. After the TCI state switch command is received by the UE for a known target TCI state, since the UE is expected to switch to the new TCI state without further Rx beam refinement or measurements, the embodiments disclosed herein provide procedures to be followed by the network to enable successful reception on TCI state.

In accordance with embodiments, for a MAC CE based TCI state change to a known TCI state, the UE needs to receive PDCCH with the new TCI state after the switching delay, without any further Rx beam refinement or measurement for the new TCI state. If the PDCCH is for scheduling DL PDSCH with the same TCI state, the UE should be able to receive PDSCH subsequently with the new TCI state. If the network always transmits with the lowest code rate—PDCCH with the maximum aggregation level and PDSCH with the lowest possible MCS such that they can be received successfully with the new TCI state, without further beam refinement and based on the Rx beam information from prior measurement.

In accordance with embodiments, for DCI based TCI state switch for PDSCH to known TCI state, for the UE to successfully receive with the new TCI state after the TCI state switching delay, PDSCH should be transmitted with the lowest MCS to ensure that it is received successfully with the new TCI state.

In accordance with embodiments, for MAC CE based TCI state switch, after a TCI state switch delay, the network transmits PDCCH with highest aggregation level with the new TCI state. In accordance with embodiments, for MAC CE based TCI state switch for PDCCH, if PDCCH is used to schedule PDSCH, PDSCH is scheduled with lowest MCS with the new TCI state. In accordance with embodiments, for DCI based TCI state switch for PDSCH, after the TCI state switch delay, the network transmits PDSCH with lowest MCS with the new TCI state.

In accordance with embodiments, the UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info.

The UE receives an activation command used to map up to 8 TCI states to the codepoints of the DCI field 'Transmission Configuration Indication' in one CC/DL BWP or in a set of CCs/DL BWPs, respectively. When a set of TCI state IDs are activated for a set of CCs/DL BWPs, where the applicable list of CCs is determined by indicated CC in the activation command, the same set of TCI state IDs are applied for all DL BWPs in the indicated CCs.

When a UE supports two TCI states in a codepoint of the DCI field 'Transmission Configuration Indication' the UE may receive an activation command. The activation command is used to map up to 8 combinations of one or two TCI states to the codepoints of the DCI field 'Transmission Configuration Indication'. The UE is not expected to receive more than 8 TCI states in the activation command.

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after slot $n+3N_{slot}^{subframe,\mu}$ where u is the SCS configuration for the PUCCH. If tci-PresentInDCI is set to "enabled" or tci-PresentInDCI-ForFormat1_2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to 'QCL-TypeA', and when applicable, also with respect to 'QCL-TypeD'.

If a UE may be configured with the higher layer parameter tci-PresentInDCI that is set as 'enabled' for the CORESET scheduling the PDSCH, the UE assumes that the TCI field is present in the DCI format 1_1 of the PDCCH transmitted on the CORESET. If a UE may be configured with the higher layer parameter tci-PresentInDCI-ForFormat1_2 for the CORESET scheduling the PDSCH, the UE assumes that the TCI field with a DCI field size indicated by tci-PresentInDCI-ForFormat1_2 is present in the DCI format 1_2 of the PDCCH transmitted on the CORESET. If the PDSCH is scheduled by a DCI format not having the TCI field present, and the time offset between the reception of the DL DCI and the corresponding PDSCH is equal to or greater than a threshold timeDurationForQCL if applicable, where the threshold is based on reported UE capability for determining PDSCH antenna port quasi co-location, the UE assumes that the TCI state or the QCL assumption for the PDSCH is identical to the TCI state or QCL assumption whichever is applied for the CORESET used for the PDCCH transmission.

If the PDSCH is scheduled by a DCI format having the TCI field present, the TCI field in DCI in the scheduling component carrier points to the activated TCI states in the scheduled component carrier or DL BWP, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability [13, TS 38.306]. When the UE may be configured with a single slot PDSCH, the indicated TCI state should be based on the activated TCI states in the slot with the scheduled PDSCH. When the UE may be configured with a multi-slot PDSCH, the indicated TCI state should be based on the activated TCI states in the first slot with the scheduled PDSCH, and UE shall expect the activated TCI states are the same across the slots with the scheduled PDSCH. When the UE may be configured with CORESET associated with a search space set for cross-carrier scheduling, and the PDCCH carrying the scheduling DCI and the PDSCH scheduled by that DCI are transmitted on the same carrier, the UE expects tci-PresentInDCI is set as 'enabled' or tci-PresentInDCI-ForFormat1_2 is configured for the CORESET, and if one or more of the TCI states configured for the serving cell scheduled by the search space set contains 'QCL-TypeD', the UE expects the time offset between the reception of the detected PDCCH in the search space set and the corresponding PDSCH is larger than or equal to the threshold timeDurationForQCL.

Independent of the configuration of tci-PresentInDCI and tci-PresentInDCI-ForFormat1_2 in RRC connected mode, if all the TCI codepoints are mapped to a single TCI state and the offset between the reception of the DL DCI and the corresponding PDSCH is less than the threshold timeDurationForQCL, the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the 'QCL-TypeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

If none of configured TCI states for the serving cell of scheduled PDSCH contains 'QCL-TypeD', the UE shall obtain the other QCL assumptions from the indicated TCI states for its scheduled PDSCH irrespective of the time offset between the reception of the DL DCI and the corresponding PDSCH. If a UE configured by higher layer parameter PDCCH-Config that contains two different values of CORESETPoolIndex in ControlResourceSet, for both cases, when tci-PresentInDCI is set to 'enabled' and tci-PresentInDCI is not configured in RRC connected mode, if the offset between the reception of the DL DCI and the corresponding PDSCH is less than the threshold timeDurationForQCL, the UE may assume that the DM-RS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE. If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, the UE may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states.

If the PDCCH carrying the scheduling DCI is received on one component carrier, and the PDSCH scheduled by that DCI is on another component carrier: The timeDurationForQCL is determined based on the subcarrier spacing of the scheduled PDSCH. If $\mu_{PDCCH} < \mu_{PDSCH}$ an additional timing delay d is added to the timeDurationForQCL; For both the cases when tci-PresentInDCI is set to 'enabled' and the offset between the reception of the DL DCI and the corresponding PDSCH is less than the threshold timeDurationForQCL and when tci-PresentInDCI is not configured, the UE obtains its QCL assumption for the scheduled PDSCH from the activated TCI state with the lowest ID applicable to PDSCH in the active BWP of the scheduled cell.

For a periodic CSI-RS resource in a NZP-CSI-RS-ResourceSet configured with higher layer parameter trs-Info, the UE shall expect that a TCI-State indicates one of the following quasi co-location type(s): 'QCL-TypeC' with an SS/PBCH block and, when applicable, 'QCL-TypeD' with the same SS/PBCH block, or 'QCL-TypeC' with an SS/PBCH block and, when applicable, 'QCL-TypeD' with a CSI-RS resource in an NZP-CSI-RS-ResourceSet configured with higher layer parameter repetition, or for an aperiodic CSI-RS resource in a NZP-CSI-RS-ResourceSet configured with higher layer parameter trs-Info, the UE shall expect that a TCI-State indicates 'QCL-TypeA' with a periodic CSI-RS resource in a NZP-CSI-RS-ResourceSet configured with higher layer parameter trs-Info and, when applicable, 'QCL-TypeD' with the same periodic CSI-RS resource.

For a CSI-RS resource in a NZP-CSI-RS-ResourceSet configured without higher layer parameter trs-Info and without the higher layer parameter repetition, the UE shall expect that a TCI-State indicates one of the following quasi co-location type(s): 'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with an SS/PBCH block, or 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or 'QCL-TypeB' with a CSI-RS resource in a NZP-CSI-RS-ResourceSet configured with higher layer parameter trs-Info when 'QCL-TypeD' is not applicable.

For a CSI-RS resource in a NZP-CSI-RS-ResourceSet configured with higher layer parameter repetition, the UE shall expect that a TCI-State indicates one of the following quasi co-location type(s): 'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in a NZP-CSI-RS-ResourceSet configured with higher layer parameter repetition, or 'QCL-TypeC' with an SS/PBCH block and, when applicable, 'QCL-TypeD' with the same SS/PBCH block.

For the DM-RS of PDCCH, the UE shall expect that a TCI-State indicates one of the following quasi co-location type(s): 'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or 'QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

For the DM-RS of PDSCH, the UE shall expect that a TCI-State indicates one of the following quasi co-location type(s): 'QCL-TypeA' with a CSI-RS resource in a NZP-CSI-RS-ResourceSet configured with higher layer parameter trs-Info and, when applicable, 'QCL-TypeD' with the same CSI-RS resource, or 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition, or QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

In some embodiments, the network may activate and deactivate the configured TCI states for PDSCH of a Serving Cell by sending the TCI States Activation/Deactivation for UE-specific PDSCH MAC CE. The configured TCI states for PDSCH are initially deactivated upon configuration and after a handover. In these embodiments, if the MAC entity receives a TCI States Activation/Deactivation for UE-specific PDSCH MAC CE on a Serving Cell, the MAC entity may indicate to lower layers the information regarding the TCI States Activation/Deactivation for UE-specific PDSCH MAC CE.

In some embodiments, the network may indicate a TCI state for PDCCH reception for a CORESET of a Serving Cell by sending the TCI State Indication for UE-specific PDCCH MAC CE. In these embodiments, if the MAC entity receives a TCI State Indication for UE-specific PDCCH MAC CE on a Serving Cell, the MAC entity may indicate to lower layers the information regarding the TCI State Indication for UE-specific PDCCH MAC CE.

In accordance with some embodiments, the UE may signal one or more of the following UE capability parameters:

additionalActiveTCI-StatePDSCH—Indicates whether the UE supports one additional active TCI-State for control in addition to the supported number of active TCI-States for PDSCH. The UE can include this field only if maxNumberActiveTCI-PerBWP in tci-StatePDSCH is set to n1. Otherwise, the UE does not include this field.

multipleTCI—Indicates whether UE supports more than one TCI state configurations per CORESET. UE is only required to track one active TCI state per CORESET. UE is required to support minimum between 64 and number of configured TCI states indicated by tci-StatePDSCH. This field shall be set to supported.

spatialRelations—Indicates whether the UE supports spatial relations. The capability signalling comprises the following parameters.

maxNumberConfiguredSpatialRelations indicates the maximum number of configures spatial relations per CC for PUCCH and SRS. It is not applicable to FR1 and applicable to FR2 only. The UE may report 16 or higher values;

maxNumberActiveSpatialRelations indicates the maximum number of active spatial relations with regarding to PUCCH and SRS for PUSCH, per BWP per CC. It is not applicable to FR1 and applicable and mandatory to report for FR2 only;

additionalActiveSpatialRelationPUCCH indicates support of one additional active spatial relations for PUCCH. It is mandatory with capability signalling if maxNumberActiveSpatialRelations is set to 1;

maxNumberDL-RS-QCL-TypeD indicates the maximum number of downlink RS resources used for QCL type D in the active TCI states and active spatial relation information, which is optional.

tci-StatePDSCH—Defines support of TCI-States for PDSCH. The capability signalling comprises the following parameters:

maxNumberConfiguredTCIstatesPerCC indicates the maximum number of configured TCI-states per CC for PDSCH. For FR2, the UE is mandated to set the value to 64. For FR1, the UE is mandated to set these values to the maximum number of allowed SSBs in the supported band;

maxNumberActiveTCI-PerBWP indicates the maximum number of activated TCI-states per BWP per CC, including control and data. If a UE reports X active TCI state(s), it is not expected that more than X active QCL type D assumption(s) for any PDSCH and any CORESETs for a given BWP of a serving cell become active for the UE. The UE shall include this field.

In these embodiments, the UE is required to track only the active TCI states. In some embodiments, the following RRC fields may be used for RRC signalling:

ControlResourceSet Field Descriptions tci-PresentInDCI—

This field indicates if TCI field is present or absent in DL-related DCI. When the field is absent the UE considers the TCI to be absent/disabled. In case of cross carrier scheduling, the network sets this field to enabled for the ControlResourceSet used for cross carrier scheduling in the scheduling cell.

tci-StatesPDCCH-ToAddList—

A subset of the TCI states defined in pdsch-Config included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports. The network configures at most maxNrofTCI-StatesPDCCH entries.

CSI-AssociatedReportConfigInfo Field Descriptions qcl-info—List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to.

NZP-CSI-RS-Resource Field Descriptions qcl-InfoPeriodicCSI-RS—For a target periodic CSI-RS, contains a reference to one TCI-State in TCI-States for providing the QCL source and QCL type. For periodic CSI-RS, the source can be SSB or another periodic-CSI-RS. Refers to the TCI-State which has this value for tci-StateId and is defined in tci-StatesToAddModList in the PDSCH-Config included in the BWP-Downlink corresponding to the serving cell and to the DL BWP to which the resource belongs to.

PDSCH-Config—The PDSCH-Config 1E is used to configure the UE specific PDSCH parameters.

tci-StatesToAddModList—A list of Transmission Configuration Indicator (TCI) states indicating a transmission configuration which includes QCL-relationships between the DL RSs in one RS set and the PDSCH DMRS ports.

Figure 3:
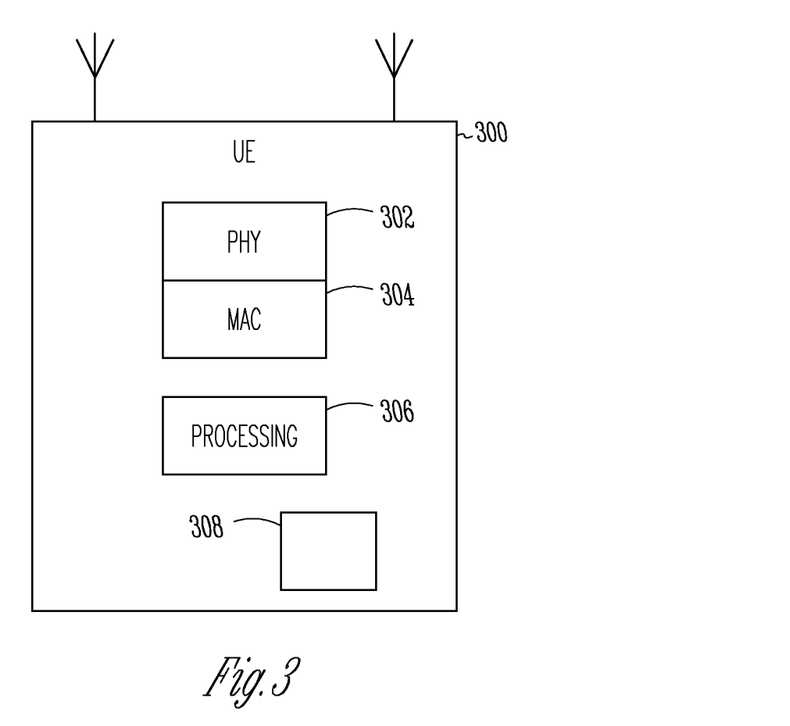
FIG. 3 illustrates an apparatus in accordance with some embodiments.

FIG. 3 illustrates an apparatus in accordance with some embodiments. Apparatus 300 may be suitable for use as a mobile device such as a UE or suitable for use as a base station such as a next-generation Node B (gNB). Apparatus 300 may comprise at least processing circuitry 306 and memory 308. The processing circuitry 306 may include a baseband processor and may implement a physical layer (PHY) 302 and medium-access control (MAC) layer 304, among other things.

In some embodiments, the gNB may be configured for operation in a fifth-generation system (5GS). In these embodiments, the processing circuitry may be configured to encode signalling for transmission to a user equipment (UE) the signalling indicating a Transmission Configuration Indication (TCI) state change to activate a new TCI state, encode a physical downlink control channel (PDCCH) for transmission to the UE in accordance with a highest aggregation level if the signalling indicating the TCI state change indicates activation of a new TCI state for the PDCCH, and encode a physical downlink shared channel (PDSCH) for transmission to the UE in accordance with a lowest modulation and coding scheme (MCS) level if the signalling indicating the TCI state change indicates activation of a new TCI state for the PDSCH. After the TCI state change, the processing circuitry may configure the gNB for transmission of reference signals (RS) with a different spatial filter or different antenna ports. The RS for demodulation of the PDCCH and PDSCH by the UE. In these embodiments, a different spatial filter may be used for FR2. Different antenna ports may be used for FR1 and FR2. The memory may be configured to store TCI states for the PDCCH and for the PDSCH. In these embodiments, the gNB may keep the lowest MCS level for the PDSCH and/or the highest aggregation level for the PDCCH until CQI feedback from the UE is received.

In some embodiments, the processing circuitry may be configured to determine whether the new TCI state is a known TCI state or an unknown TCI state. In these embodiments, a known TCI state comprises a TCI state in which the gNB has received a layer one (L1) reference signal receive power (RSRP) (L1-RSRP) measurement report or a layer three (L3) RSRP (L3-RSRP) measurement report for the new TCI state from the UE within a predetermined time.

In some embodiments, the processing circuitry may be further configured to encode radio-resource control (RRC) signaling to configure the UE with a list of one or more TCI states for decoding the PDCCH and one or more TCI states for decoding the PDSCH. In these embodiments, the TCI states for the PDCCH may be a subset of the TCI states for the PDSCH, and the new TCI state is a TCI state on the list. In these embodiments, each TCI state on the list contains parameters for configuring a quasi co-location (QCL) relationship between one or two downlink reference signals and demodulation reference signal (DM-RS) ports of the PDSCH or a DM-RS port of the PDCCH or a CSI-RS port(s) of a CSI-RS resource.

In some embodiments, the signalling indicating the TCI state change for the PDCCH may comprise a medium-access control (MAC) control element (MAC CE) indicating a switch to the new TCI for the PDCCH. In these embodiments, the gNB may transmit the PDCCH in accordance with the highest aggregation level to help ensure that the UE can successfully receive the PDCCH with the new TCI state.

In some embodiments, the signalling indicating the TCI state change for the PDCCH comprises a medium-access control (MAC) control element (MAC CE) indicating a switch to the new TCI for a PDCCH that schedules the PDSCH, and the processing circuitry may be configured to encode the scheduled PDSCH in accordance with the lowest MCS. In these embodiments, the gNB may transmit the PDSCH scheduled by the PDCCH in accordance with the lowest MCS to help ensure that the UE can successfully receive the PDSCH with the new TCI state.

In some embodiments, the signalling indicating the TCI state change comprises a downlink control information (DCI) and indicates activation of a new TCI state for the PDSCH. In these embodiments, the gNB may transmit the PDSCH in accordance with the lowest MCS to help ensure that the UE can successfully receive the PDSCH with the new TCI state.

In some embodiments, the processing circuitry may be configured to encode the PDCCH or the PDSCH for transmission to the UE after a switching delay. In these embodiments, the switching delay may be based at least in part whether the new TCI state is a known TCI state or an unknown TCI state.

In some embodiments, the switching delay may be longer when the new TCI state is an unknown TCI state and the switching delay may be shorter when the new TCI state is a known TCI state. In these embodiments, the switching delay allows time for the UE to begin receiving with a new TCI state and to allow additional time for the UE to perform beam refinement when the TCI state is unknown.

In some embodiments, after switching to the new TCI state and transmission of the PDSCH, the processing circuitry is further configured to decode channel state information (CSI) received from the UE based on reference signals associated with the new TCI state for the PDSCH, determine a new MCS based on the CSI, indicate the new MCS for the UE to use for decoding the PDSCH, and encode the PDSCH in accordance with a new MCS for transmission to the UE.

In some embodiments, a non-transitory computer-readable storage medium that stores instructions for execution by the processing circuitry of gNB that is configured for operation in a fifth-generation system (5GS).

In some embodiments, the UE may be configured for operation in a 5GS and the processing circuitry may be configured to decode signalling from a gNB indicating a Transmission Configuration Indication (TCI) state change activating of a new TCI state, decode a physical downlink control channel (PDCCH) in accordance with a highest aggregation level if the signalling indicating the TCI state change indicates activation of a new TCI state for the PDCCH, and decode a physical downlink shared channel (PDSCH) in accordance with an indicated modulation and coding scheme (MCS) level. In these embodiments, the indicated MCS level is a lowest MCS level if the signalling indicating the TCI state change indicates activation of a new TCI state for the PDSCH. The memory may be configured to store TCI states for the PDCCH and for the PDSCH.

In these embodiments, the UE may perform blind decoding a number of PDCCH candidates based on a PDCCH search space for PDCCH acquisition indicated in a system information block (SIB). The UE may perform blind decoding on all possible combinations of aggregation level for PDCCH depending on the CORESET config. In these embodiments, the UE decodes the PDCCH and/or the PDSCH based on reference signals used for demodulation (i.e., DM-RS) the reference signals are associated with the TCI state. The MCS level used for decoding the PDSCH may be indicated by the gNB to be the lowest MCS level when a new TCI state is activated.

In some embodiments, if the new TCI state for the PDCCH is an unknown TCI state for the PDCCH, the processing circuitry is to configure the UE to perform receive beam refinement prior to decoding the PDCCH with the new TCI state. In these embodiments, if the new TCI state for the PDCCH is a known TCI state for the PDCCH, the processing circuitry may be configured to refrain from configuring the UE to perform the receive beam refinement prior to decoding the PDCCH with the new TCI state. In these embodiments, if the new TCI state for the PDSCH is an unknown TCI state for the PDSCH, the processing circuitry is to configure the UE to perform receive beam refinement prior to decoding the PDSCH with the new TCI state. In these embodiments, if the new TCI state for the PDSCH is a known TCI state for the PDSCH, the processing circuitry is to refrain from configuring the UE to perform the receive beam refinement prior to decoding the PDSCH with the new TCI state. In these embodiments, the UE does not need to perform additional receive beam refinement prior to decoding the PDCCH/PDSCH with a known TCI state. The TCI state indicates the QCL type and antenna ports. On the other hand, the UE may need to perform additional receive beam refinement prior to decoding the PDCCH/PDSCH with an unknown TCI state.

In some embodiments, in response to the signalling indicating the TCI state change, the processing circuitry may be configured to determine whether the new TCI state is a known TCI state or an unknown TCI state. In these embodiments, a known TCI state comprises a TCI state in which the UE has sent a layer one (L1) reference signal receive power (RSRP) (L1-RSRP) measurement report or a layer three (L3) RSRP (L3-RSRP) measurement report for the TCI state to the gNB within a predetermined time.

In some embodiments, the UE may be configured via radio-resource control (RRC) signaling with a list of one or more TCI states for decoding the PDCCH and one or more TCI states for decoding the PDSCH, the TCI states for the PDCCH being a subset of the TCI states for the PDSCH. In these embodiments, each TCI state on the list contains parameters for configuring a quasi co-location (QCL) relationship between one or two downlink reference signals and DM-RS ports of the PDSCH or a DM-RS port of the PDCCH or a CSI-RS port(s) of a CSI-RS resource.

In some embodiments, after switching to the new TCI and decoding the PDSCH, the UE is further configured to encode channel state information (CSI) for transmission to the gNB, the CSI comprising a PMI, a CQI and RI for the PDSCH based on reference signals associated with the new TCI for the PDSCH, receive an indicating a new MCS for decoding the PDSCH, and decode the PDSCH in accordance with a new MCS, the new MCS determined by the gNB based on the CSI.

In some embodiments, the mobile device may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas (FIG. 3) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the mobile device is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for operation in a fifth-generation system (5GS), the apparatus comprising: processing circuitry; and memory, wherein the processing circuitry is configured to:

decode radio-resource control (RRC) signalling to configure the UE with a list of one two or more Transmission Configuration Indication (TCI) states for a physical downlink control channel (PDCCH);

wherein each TCI state on the list defines a quasi co-location (QCL) relationship between downlink reference signals and a demodulation reference signal (DM-RS) port of the PDCCH;

decode a TCI state indication via a medium-access control (MAC) control element (MAC CE) that indicates a single one of the TCI states on the list to activate for PDCCH reception for a control resource set (CORESET) of a serving cell; and demodulate the PDCCH using one of the downlink reference signals based on the QCL relationship for the activated TCI state, wherein for a physical downlink shared channel (PDSCH) scheduled by the PDCCH, the processing circuitry is to demodulate the PDSCH based on the activated TCI state of the PDCCH for a time period in accordance with a timeDurationForQCL parameter, and wherein the RRC signalling further comprises information to configure the UE with a list of two or more TCI states for the PDSCH, the TCI states for the PDCCH being a subset of the TCI states for the PDSCH, each TCI state for the PDSCH defining a QCL relationship between downlink reference signals and DM-RS ports of the PDSCH, and wherein the processing circuitry is configured to decode a TCI state indication via a second MAC CE that indicates a single one of the TCI states on the list to activate for the PDSCH of the serving cell, wherein the memory is configured to store the TCI states.

2. The apparatus of claim 1, wherein the RRC signalling comprises a CORESET information element (IE) to configure the UE with the list of one or more TCI states for the PDCCH.

3. The apparatus of claim 2, wherein the processing circuitry is configured to apply spatial relation information to the downlink reference signal in accordance with the QCL relationship configured by the activated TCI state for demodulation of the PDCCH.

4. An apparatus of a user equipment (UE) configured for operation in a fifth-generation system (5GS), the apparatus comprising: processing circuitry; and memory, wherein the processing circuitry is configured to:

decode radio-resource control (RRC) signalling to configure the LTE with a list of one or more Transmission Configuration Indication (ICI) states for a physical downlink control channel (PDCCH);

wherein each TCI state on the list defines a quasi co-location (QCL) relationship between downlink reference signals and a demodulation reference signal (DM-RS) port of the PDCCH;

decode a TCI state indication via a medium-access control (MAC) control element (MAC CE) that indicates one of the TCI states on the list to activate for PDCCH reception for a control resource set (CORESET) of a serving cell; and demodulate the PDCCH using one of the downlink reference signals based on the QCL relationship for the activated TCI state, wherein the processing circuitry is configured to decode the PDCCH based on the activated TCI after an activation delay, wherein the activation delay is based at least in part whether the activated TCI state is a known TCI state or an unknown TCI state, and wherein the memory is configured to store the TCI states.

5. The apparatus of claim 4 wherein the processing circuitry is configured to determine whether the activated TCI state is a known TCI state or an unknown TCI state, wherein a known TCI state comprises a TCI state in which the UE has provided a layer one (L1) reference signal receive power (RSRP) (L1-RSRP) measurement report or a layer three (L3) RSRP (L3-RSRP) measurement report for the activated TCI state.

6. The apparatus of claim 4, wherein the processing circuitry is configured to initially decode the scheduled PDSCH in accordance with the lowest modulation and coding scheme (MCS) after a TCI state change.

7. the apparatus of claim 4, wherein the processing circuitry is configured to decode the PDCCH in accordance with a highest aggregation level if the MAC-CE indicates activation of a new TCI state for the PDCCH.

8. A non-transitory computer-readable storage medium that stores instructions for execution by processing circuitry of a user equipment (UE) configured for operation in a fifth-generation system (5GS), the instructions to configure the processing circuitry to:

decode radio-resource control (RRC) signalling to configure the UE with a list of one or more Transmission Configuration Indication (TCI) states for a physical downlink control channel (PDCCH);

wherein each TCI state on the list defines a quasi co-location (QCL) relationship between downlink reference signals and a demodulation reference signal (DM-RS) port of the PDCCH;

decode a TCI state indication via a medium-access control (MAC) control element (MAC CE) that indicates one of the TCI states on the list to activate for PDCCH reception for a control resource set (CORESET) of a serving cell; and demodulate the PDCCH using one of the downlink reference signals based on the QCL relationship for the activated TCI state, wherein for a physical downlink shared channel (PDSCH) scheduled by the PDCCH, the processing circuitry is to demodulate the PDSCH based on the activated TCI state of the PDCCH for a time period in accordance with a timeDurationForQCL parameter, and wherein the RRC signalling further comprises information to configure the UE with a list of two or more TCI states for the PDSCH, the TCI states for the PDCCH being a subset of the TCI states for the PDSCH, each TCI state for the PDSCH defining a QCL relationship between downlink reference signals and DM-RS ports of the PDSCH, and wherein the processing circuitry is configured to decode a TCI state indication via a second MAC CE that indicates one of the TCI states on the list to activate for the PDSCH of the serving cell.

9. The non-transitory computer-readable storage medium of claim 8, wherein the RRC signalling comprising a CORESET information element (IE) to configure the UE with the list of one or more TCI states for the PDCCH.

10. The non-transitory computer-readable storage medium of claim 9, wherein the processing circuitry is configured to apply spatial relation information to the downlink reference signal in accordance with the QCL relationship configured by the activated TCI state for demodulation of the PDCCH.

11. A non-transitory computer-readable storage medium that stores instructions for execution by processing circuitry of a user equipment (UE) configured for operation in a fifth-generation system (5GS), the instructions to configure the processing circuitry to:

decode radio-resource control (RRC) signalling to configure the UE with a list of one or more Transmission Configuration Indication (TCI) states for a physical downlink control channel (PDCCH);

wherein each TCI state on the list defines a quasi co-location (QCL) relationship between downlink reference signals and a demodulation reference signal (DM-RS) port of the PDCCH;

decode a TCI state indication via a medium-access control (MAC) control element (MAC CE) that indicates one of the TCI states on the list to activate for PDCCH reception for a control resource set (CORESET) of a serving cell; and demodulate the PDCCH using one of the downlink reference signals based on the QCL relationship for the activated TCI state, wherein the processing circuitry is configured to decode the PDCCH based on the activated TCI after an activation delay, wherein the activation delay is based at least in part whether the activated TCI state is a known TCI state or an unknown TCI state.

12. An apparatus of a generation node B (gNB) configured for operation in a fifth-generation system (5GS), the apparatus comprising: processing circuitry; and memory, wherein the processing circuitry is configured to:

encode radio-resource control (RRC) signalling to configure a user equipment (UE) with a list of one or more Transmission Configuration Indication (TCI) states for a physical downlink control channel (PDCCH);

wherein each TCI state on the list defines a quasi co-location (QCL) relationship between downlink reference signals and a demodulation reference signal (DM-RS) port of the PDCCH;

encode a TCI state indication via a medium-access control (MAC) control element (MAC CE) for transmission to the UE, the MAC-CE indicating a single one of the TCI states on the list to activate for PDCCH reception for a control resource set (CORESET) of a serving cell; and cause the gNB to transmit the PDCCH using one of the downlink reference signals based on the QCL, relationship for the activated TCI state, wherein for a physical downlink shared channel (PDSCH) scheduled by the PDCCH, the processing circuitry is to cause the gNB to modulate the PDSCH based on the activated TCI of the PDCCH for a time period in accordance with a timeDurationForQCL parameter, wherein the RRC signalling further comprises information to configure the UE with a list of two or more TCI states for the PDSCH, the TCI states for the PDCCH being a subset of the TCI states for the PDSCH, each TCI state for the PDSCH defining a QCL relationship between downlink reference signals and DM-RS ports of the PDSCH, and wherein the processing circuitry is configured to encode a TCI state indication via a second MAC CE that indicates a single one of the TCI states on the list to activate for the PDSCH of the serving cell, wherein the memory is configured to store the TCI states.

13. The apparatus of claim 12, wherein the processing circuitry of the gNB is configured to encode the RRC signalling to include a CORESET information element (IE) to configure the UE with the list of one or more TCI states for the PDCCH.

* * * * *

UNITED STATES PATENT AND TRADEMARK OFFICE
CERTIFICATE OF CORRECTION

| | |
|---|---|
| PATENT NO. | : 11,337,203 B2 |
| APPLICATION NO. | : 16/829353 |
| DATED | : May 17, 2022 |
| INVENTOR(S) | : Raghavan et al. |

It is certified that error appears in the above-identified patent and that said Letters Patent is hereby corrected as shown below:

In the Claims

In Column 13, Line 47, in Claim 4, delete "LTE" and insert --UE-- therefor

In Column 13, Line 48, in Claim 4, delete "(ICI)" and insert --(TCI)-- therefor

In Column 14, Line 13, in Claim 7, delete "the apparatus" and insert --The apparatus-- therefor In Column 16, Line 11, in Claim 12, delete "QCL," and insert --QCL-- therefor Signed and Sealed this
Sixth Day of December, 2022

Katherine Kelly Vidal
*Director of the United States Patent and Trademark Office*